United States Patent [19]

Koch et al.

[11] 4,179,313

[45] Dec. 18, 1979

[54] METHOD OF MAKING AN ARTICLE HAVING A CAST-IN PLACE BEARING

[75] Inventors: James H. Koch, Oregon; Richard A. Ritzenthaler, Toledo, both of Ohio

[73] Assignee: N L Industries, Inc., New York, N.Y.

[21] Appl. No.: 863,717

[22] Filed: Dec. 23, 1977

Related U.S. Application Data

[63] Continuation-in-part of Ser. No. 715,418, Aug. 18, 1976, abandoned.

[51] Int. Cl.² .................... B23P 11/00; C22F 1/00
[52] U.S. Cl. ................ 148/3; 29/149.5 B; 29/441 R; 148/125; 148/127; 403/269
[58] Field of Search .................... 148/3, 125, 127; 428/637, 638, 650–652; 164/91, 92, 93, 94, 95, 96, 98, 103, 105, 107, 111; 29/149.5 NM, 149.5 B, 527.5, 527.3; 308/238, 239; 403/269

[56] References Cited

U.S. PATENT DOCUMENTS

| | | | |
|---|---|---|---|
| 1,881,601 | 10/1932 | Hufferd et al. | 403/269 |
| 1,900,617 | 3/1933 | Ricardo | 403/269 |
| 2,252,351 | 8/1941 | Paulus | 403/269 |
| 3,204,304 | 9/1965 | Kostenko | 29/196.2 |
| 3,314,829 | 4/1967 | Sunnucks | 148/3 |
| 3,763,535 | 10/1973 | Gallagher | 29/441 |
| 3,786,543 | 1/1974 | Sato | 29/441 |
| 3,953,922 | 5/1976 | Heim | 148/125 |

*Primary Examiner*—L. Dewayne Rutledge
*Assistant Examiner*—Peter K. Skiff
*Attorney, Agent, or Firm*—Gerald K. White

[57] ABSTRACT

A composite part having freely movable components is manufactured by casting one component around the other to form an essentially locked unit and then freeing the components by thermal treatment.

19 Claims, 5 Drawing Figures

METHOD OF MAKING AN ARTICLE HAVING A CAST-IN PLACE BEARING

CROSS REFERENCE TO RELATED APPLICATION

This application is a continuation-in-part of patent application Ser. No. 715,418, filed Aug. 18, 1976, and now abandoned.

The present invention provides a method for casting and thermally treating a composite article, such as a piston and connecting rod insert. Die casting is preferred in making articles of this nature because the process is faster and less expensive than other processes such as permanent mold casting, low pressure casting and sand casting. However, such other processes may be employed in the practice of the invention if desired. Though the composite casting is ejected from the die with the parts essentially frozen together, the present invention provides a thermal method to free them one from the other.

In general, the method of the invention comprises introducing a component having a bearing surface thereon into a casting die and then casting another component within the die to form a composite part in which the cast component at least partially surrounds and captures the introduced component thereby rendering relative movement between the components essentially impossible. Of course, it is possible for either component to have the bearing surface. To free the components from each other so that the composite part may be used for applications involving relative movement, a thermal treatment involving the creation and substantial elimination of a temperature differential between the respective components is employed. The treatment may comprise placing the part, for an appropriate time, in an environment that is either higher or lower than the temperature of the part. To establish the requisite differential, the part is rather rapidly cooled. As will become more apparent later, cooling may be accomplished either following heating of the part or directly from the ambient temperature of the part. Such procedure frees the components, establishes a clearance therebetween, and permits relative movement therebetween.

Figure 1:
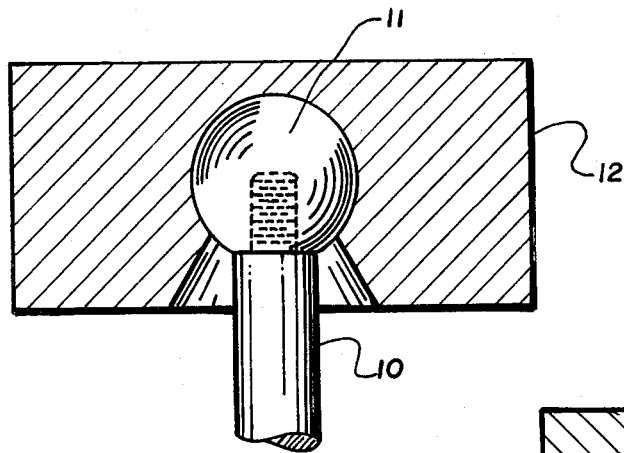
FIG. 1 is a central, vertical, sectional view of a piston having a spherical connecting rod insert cast in place.
Figure 2:
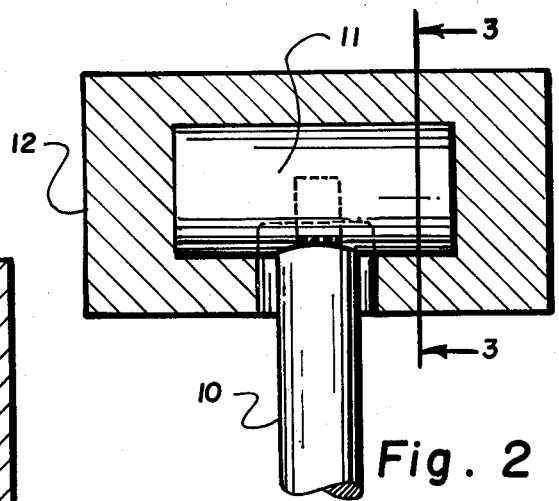
FIG. 2 is a similar view showing a cylindrical insert configuration.
Figure 4:
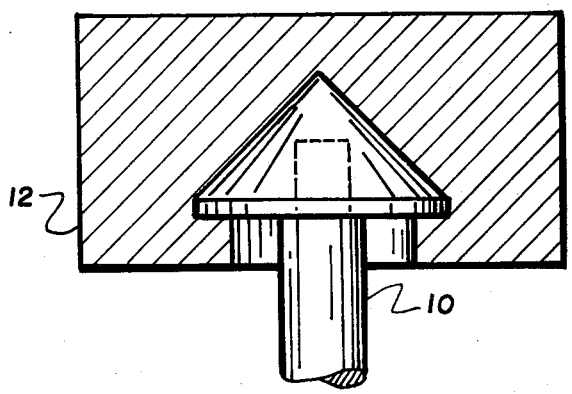
FIG. 4 is a diagrammatic sectional view of a part having a cast-in-place conical insert.
Figure 3:
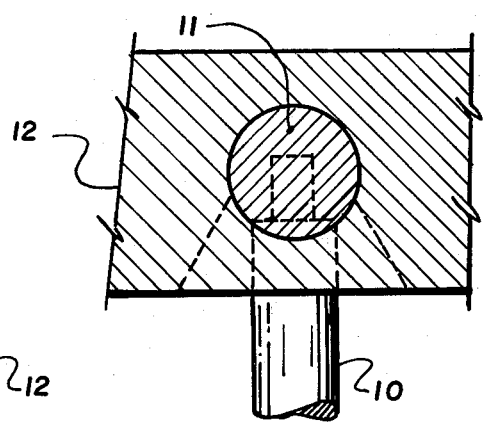
FIG. 3 is a section on line 3—3 of FIG. 2.
Figure 5:
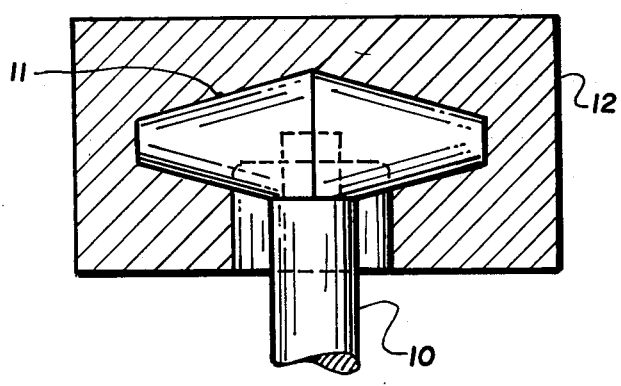
FIG. 5 is a diagrammatic sectional view of a part having a cast-in-place double cone insert.

The present invention constitutes a method for making composite parts such as those shown in the drawings wherein a first component such as a connecting rod is designated 10. The first component is received in a second component such as the body of a piston 12. The composite part need not be a piston-connecting rod combination, but this combination lends itself to an easily understandable description of our new method.

It should be understood that the invention is applicable for producing a wide variety of composite parts including those having more than two members. Such parts include these in which a material is cast between two previously introduced members and then freed from at least one of the members by the thermal treatment of the invention. Other variants would readily occur to those skilled in the art.

The components of the composite part of the invention may be selected from a variety of materials, both metallic and nonmetallic. When the both components are metallic, the same or dissimilar metals and alloys may be used. Exemplary materials suitable for use in the invention include iron, aluminum, copper, magnesium, and zinc and their alloys.

In manufacturing a composite part, a first component such as connecting rod 10 is provided with bearing 11 which ultimately journals the components of the combination with respect to each other. The component is inserted into a casting die having an appropriate configuration.

If desired, bearing end 11 of the connecting rod is first given a lubricant coating by swabbing the exposed end of the insert with, for example, a colloidal graphite suspension. Various other lubricating substances or parting agents such as salts, waxes, oxides, etc. may be used. In some instances, a second lubricant such as a coating of polytetrafluoroethylene is sprayed on. Coating may advantageously take place outside the casting machine as well as after the insert has been placed in the die. The exterior of the polytetrafluoroethylene coating, as applied, appears to be rough in texture, but after casting and subsequent thermal treatments, it appears that the coating has been transplanted to the surrounding casting and that the first element moves with respect to the coating which, of course, has a very low coefficient of friction.

The configuration of the insert, whether it be spherical, cylindrical or conical or otherwise shaped is not important since the method can be employed with any of these configurations and others.

As will become more apparent later, a relatively simple thermal treatment is then performed upon the cast composite site part for the purpose of freeing the components from each other, establishing a clearance between the components, and permitting relative movement between the components. It has been discovered that the establishment and consequent substantial elimination of a temperature differential between the components gives rise to separation of the components. The freeing of the respective components is believed to be related to stresses created at the interface of the components which are of a magnitude such that at least one of the components is deformed beyond its yield point due to the temperature differential created during cooling. The requisite temperature differential may be established by placing the composite part in an environment having a temperature below that of the part to create a temperature differential between the outer and inner portions of the composite part or by first heating the part to a higher temperature and then rapidly cooling. When higher temperature environments are used, temperatures up to that of the lowest melting point of a metallic component may be used. Cooling environments down to the temperature of liquid nitrogen are practicable when lower temperature environments are used.

As will be readily appreciated by those skilled in the art, the times and environmental temperatures needed to produce the product of the invention are dependent upon the relative mass and compositions of the composite part as well as the degree of clearance desired. Simple experimentation is recommended to optimize such parameters. In this connection it is pointed out that as the size of the inner or first component decreases relative to that of the second or surrounding component, for a given clearance, higher differential temperatures and absolute temperatures are required.

The substantial elimination of the temperature differential for the highest temperature environment embodiments is accomplished by permitting the composite part to reach ambient temperature, after rapid cooling has established the requisite temperature differential. Quenching in water or other suitable fluid media constitutes a preferred cooling technique due to time savings, etc. Elimination of the temperature differential for the lower temperature environment embodiments is also accomplished by permitting the composite part to stand at ambient temperature. Of course, heating techniques may be utilized should time be a problem.

For example, when the first component is an iron alloy such as steel and the second component is zinc, the composite part may be first heated and then cooled to create the requisite temperature differential by placing it in an environment of about 300° F. to 500° F. for on the order of 15 to 40 minutes and then water quenching. Although temperatures in excess of 500° F. up to the melting point of zinc may be utilized, such temperatures are not preferred when the zinc has been die cast due to the tendency to form blisters in the zinc. The requisite clearance and freedom of movement may also be obtained by cooling from ambient temperature by placing the same composite part in an environment of at least about $-120°$ F. for on the order of 15 to 40 minutes and then permitting the part to return to ambient temperature.

Iron and magnesium composite parts may be conveniently treated by using an environmental temperature of about 700° F. to 850° F. followed by quenching.

Environmental temperatures from 750° F. to 950° F. are recommended when aluminum is the second or cast component. Such temperature range has been found to be workable when aluminum or aluminum alloys have been cast around steel, brass, aluminum or aluminum alloys.

It has been also discovered that if a composite aluminum alloy-iron alloy casting is heat treated by the following process, the initially essentially frozen parts are freed and a very satisfactory product results:

1. Die cast at normal high pressures.
2. Optionally quench in water as the part comes from the die casting machine if hardness is desired in the aluminum.
3. Reheat to 750° F. to 950° F.
4. Hold the heat in step 3 for a period of ten to thirty minutes depending upon the clearance desired.
5. Quench in water to bring the casting back to room temperature.
6. Age or harden the aluminum alloy by heating to 320° F. to 350° F. for about four hours.
7. Cool to room temperature.

Apart from the controlled temperature aspects of the invention, there is also provided a step to obtain a long lasting lubricant film between the working surfaces of the bearing and its housing. This step includes the application of a coating of polytetraflouroethylene to the bearing surface prior to casting.

For purposes of describing a specific embodiment of the invention, it will be assumed that the first component of the composite part is a ferrous alloy such as steel or cast iron, of a composition conventionally used for the desired part. Such an alloy may have a melting point in the range of 2500° F. to 2800° F. and a coefficient of thermal expansion of $6.5 \times 10^{-6}$ in. per in. per degree F.

After the first component has been coated and inserted into the die casting machine the die halves are closed and the shot made. The die casting pressure is normally from 3000 psi to 10,000 psi for an aluminum alloy. The aluminum alloy is preferably of a character of the alloy known commercially as 380 alloy having the following nominal composition:

Si . . . 9%
Fe . . . 1.0%
Cu . . . 3.5%
Mg . . . 0.2%
Al . . . Balance

The melting point of such an alloy is in the range of 1000° F. to 1100° F. and its coefficient of thermal expansion is $11.7 \times 10^{-6}$ in. per in. per degree F.

By inspection of the drawings, it will be seen that the cast metal surrounds more than 180° of the bearing part 11 of the connecting rod so that the first element is captured by the second. The parts are ejected from the die casting machine in a locked condition and are essentially incapable of relative movement after the cast metal has shrunk around the insert.

The composite casting is ejected or removed from the die casting machine while it is still at a temperature of about 700° F. to 800° F. and is preferably quenched promptly in water to cool it to room or ambient temperature.

The composite casting or part is then placed in a furnace held at a temperature of between 750° F. and 950° F., preferably 850° F. to 950° F. to reduce the required holding time where the part is rapidly reheated. The casting remains in the furnace for a period of ten to twenty minutes depending upon the final clearance desired for the bearing. Longer reheat times give greater clearance for the bearing in the final product. For example, in a part in which the bearing diameter was 0.565 inches and a clearance of 0.0005 inches was desired, a reheat time of 25 minutes was preferred.

After reheating, the composite part is again quenched in water. At about 600° F., the surrounding aluminum alloy has a greatly reduced tensile strength and yield point and reheating has carried the aluminum alloy above this temperature. Quenching now results in a rapid contraction of the aluminum alloy around the still hot ferrous alloy element. As the aluminum cools, it appears to take a permanent set at the expanded dimension of the ferrous alloy part which is cooled later in the quenching cycle because it has been largely insulated from the quenching liquid by the aluminum alloy. When the ferrous alloy element finally reaches the temperature of the quenching medium, a clearance exists between the elements and the bearing is now free in its socket.

A preferred final step in the process consists in hardening the aluminum alloy by soaking at a temperature of from 320° F. to 350° F. for a period of about four hours. This hardening or aging of the aluminum alloy is known to improve its resistance to wear, and its hardness, and is known as a T-5 heat treatment.

After aging, the parts are again cooled and are now ready for final assembly and the bearing surface 11 is fully operative to journal one part with respect to the other. The graphite and polytetraflourethylene coatings have not been destroyed by the successive heating and cooling steps but are functional to serve as inplace lubricants. The hardening treatment has given the aluminum alloy a Brinell hardness of approximately 100 so that minimum wear occurs.

As previously noted, the polytetraflourethylene coating appears to be stationary with respect to the body 12 and the bearing 11 moves therein. This transplanting of the polytetraflourethylene coating from the bearing 11 to the body 12 probably takes place during the die casting operation itself.

It has been found that instead of reheating the casting, a clearance between the parts can be established by immersing the casting in liquid nitrogen for a period of 15 to 30 minutes. In this case the aluminum shrinks around the ferrous alloy part due to its high thermal contraction. Following shrinkage, the age hardening step may be optionally performed. This phenomenon would give rise to the proposition that it is only necessary to establish a temperature differential between the two alloys to bring about the desired clearance. The time required will depend on the relative mass of the parts being treated.

Pertinent information for five examples of the invention is contained in the Table. All examples resulted in the establishment of a clearance and relative movement between the components upon performance of the indicated thermal treatment of a die cast and essentially locked composite part.

TABLE

| INSERTED COMPONENT | CAST COMPONENT | ENVIRONMENTAL TEMPERATURE | TIME IN ENVIRONMENTAL TEMPERATURE | TEMPERATURE DIFFERENTIAL TREATMENT |
| --- | --- | --- | --- | --- |
| Type 6061 Al Alloy | Type 380 Al Alloy | 820° F. | 40 Min. | Water Quench |
| Brass | Type 380 Al Alloy | 840° F. | 40 Min. | Water Quench |
| Steel | Zinc | −120° F. | 2 Hrs. | Placed in ambient temperature |
| Steel | Zinc | 400° F. | 40 Min. | Water Quench |
| Steel | Magnesium | 750° F. | 40 Min. | Water Quench |

What is claimed is:

1. A method for making a composite part having at least two components wherein one component is movable with respect to another, comprising:
   a. introducing a first component having a bearing surface thereon into a casting die;
   b. casting a second component within said casting die to form a composite part with said first component;
   c. cooling said composite part to ambient temperature to form a casting in which said first component is captured by and is essentially incapable of relative movement with said second component; and
   d. then thermally treating said casting by establishing and then substantially eliminating a sufficient temperature differential between said first and second components to free said first component and its bearing surface from said second component, establish a clearance therebetween, and permit relative movement between said components.

2. The method of claim 1, wherein: said first and second components comprise a metal.

3. The method of claim 2, wherein: said temperature differential is established and substantially eliminated by placing said composite part in an environment having a temperature above that of the composite part and below the melting point of the component of the composite having the lowest melting point and then cooling said part.

4. The method of claim 2, wherein: said first component comprises a copper alloy, said second component comprises an aluminum alloy, and said thermal treatment comprises establishing and then substantially eliminating said temperature differential by placing said composite part in an environment having a temperature from about 750° F. to 950° F. and cooling said composite part.

5. The method of claim 2, wherein: said first and second components comprise the same metal.

6. The method of claim 5, wherein: said first component comprises an aluminum alloy, said second component comprises an aluminum alloy and said thermal treatment comprises establishing and then substantially eliminating said temperature differential by placing said composite part in an environment having a temperature from about 750° F. to 950° F. and cooling said composite part.

7. The method of claim 2, wherein: said temperature differential is established and substantially eliminated by placing said composite part in an environment having a temperature lower than that of the composite part and above or equal to that of liquid nitrogen and then removing said composite part from said environment so as to permit the composite part to return to a higher temperature.

8. The method of claim 7, wherein: said composite part is thermally treated by placing the part in liquid nitrogen for about 15 to 30 minutes and then removing the part and permitting the part to return to ambient temperature.

9. The method of claim 2, wherein: said first metal component is selected from the group consisting of iron and iron alloys and said second metal component is selected from the group consisting of aluminum, aluminum alloys, copper, copper alloys, magnesium, magnesium alloys, zinc, and zinc alloys.

10. The method of claim 9, wherein: said first component comprises an iron alloy, and said second component comprises zinc, and said thermal treatment comprises establishing and then substantially eliminating said temperature differential by placing said composite part in an environment having a temperature as low as about −120° F. and then permitting said composite part to return to a higher temperature.

11. The method of claim 9, wherein: said first component comprises an iron alloy, said second component comprises zinc, and said thermal treatment comprises establishing and then substantially eliminating said temperature differential by placing said composite part in an environment having a temperature of about 300° F. to 500° F. and cooling said composite part.

12. The method of claim 9, wherein: said first component comprises an iron alloy, said second component comprises magnesium and said thermal treatment comprises establishing and then substantially eliminating said temperature differential by placing said composite part in an environment having a temperature of about 700° F. to 850° F. and cooling said composite part.

13. The method of claim 9, wherein: said first component comprises an iron alloy and said second component comprises an aluminum alloy.

14. The method of claim 13, wherein: said temperature differential is established and substantially eliminated by placing said composite part in a environment having a temperature above that of the composite part and below the melting point of the aluminum containing component and then cooling said part.

15. The method of claim 14, wherein: said part is placed in an environment between about 750° F. to about 950° F. for a time from about 7 to about 20 minutes.

16. The method of claim 15 which further includes the step of: age hardening the aluminum containing component following said thermal treatment by heating the part to a temperature from about 320° F. to about 350° F.

17. The method of claim 1, wherein: said second component is die cast within said casting die.

18. The method of claim 1, wherein: said temperature differential is established and substantially eliminated by placing said composite part in an environment having a temperature above that of the composite part and below the melting point of the component of the composite having the lowest melting point and then cooling said part.

19. The method of claim 1, wherein: said temperature differential is established and substantially eliminated by placing said composite part in an environment having a temperature lower than that of the composite part and above or equal to that of liquid nitrogen and then removing said composite part from said environment so as to permit the composite part to return to a higher temperature.

* * * * *